United States Patent [19]
McMillen

[11] Patent Number: 5,924,269
[45] Date of Patent: Jul. 20, 1999

[54] NARROW ROW CORN HEAD WITH STAGGERED HEIGHT GATHERING CHAINS

[75] Inventor: Richard E. McMillen, Sherrard, Ill.

[73] Assignee: Case Corporation, Racine, Wis.

[21] Appl. No.: 08/754,129

[22] Filed: Nov. 22, 1996

[51] Int. Cl.$^6$ .......................... A01D 45/02; A01D 57/22; A01D 61/04
[52] U.S. Cl. ........................ 56/66; 56/88; 56/98; 56/111; 56/119
[58] Field of Search .................................. 56/66, 94, 57, 56/62, 65, 59, 73, 74, 75, 77, 78, 80, 81, 82, 84, 86, 88, 89, 92, 93, 96, 98, 99, 109, 119, 106, 111

[56] References Cited

U.S. PATENT DOCUMENTS

| | | |
|---|---|---|
| Re. 31,063 | 10/1982 | Greiner et al. . |
| Re. 31,064 | 10/1982 | Shriver . |
| 1,586,069 | 5/1926 | Clark et al. . |
| 2,379,822 | 7/1945 | Mitchell et al. . |
| 2,491,195 | 12/1949 | Messenger et al. . |
| 2,527,786 | 10/1950 | Barkstrom . |
| 2,826,031 | 3/1958 | Hansen . |
| 2,961,820 | 11/1960 | Hadley . |
| 3,352,093 | 11/1967 | Procter . |
| 3,496,708 | 2/1970 | Bornzin . |
| 3,528,233 | 9/1970 | Martner et al. . |
| 3,528,234 | 9/1970 | Kowalik et al. . |
| 3,585,789 | 6/1971 | Blanshine et al. ..................... 56/106 X |
| 3,670,482 | 6/1972 | Blanshine et al. . |
| 3,759,021 | 9/1973 | Schreiner et al. . |
| 3,808,783 | 5/1974 | Sutherland et al. . |
| 3,818,685 | 6/1974 | Stoessel et al. . |
| 3,854,272 | 12/1974 | Lane, III et al. . |
| 3,894,382 | 7/1975 | Jauss . |
| 3,940,913 | 3/1976 | Wallenfang et al. . |
| 3,982,384 | 9/1976 | Rohweder et al. . |
| 4,009,557 | 3/1977 | Reicks . |
| 4,106,270 | 8/1978 | Weigand et al. . |
| 4,227,368 | 10/1980 | Mossman et al. . |
| 4,259,831 | 4/1981 | Jerke et al. ........................... 56/119 X |
| 4,269,017 | 5/1981 | deBuhr et al. . |
| 4,327,542 | 5/1982 | Van Ginhoven . |
| 4,333,304 | 6/1982 | Greiner et al. . |
| 4,493,181 | 1/1985 | Glendenning et al. . |
| 4,531,351 | 7/1985 | Sousek . |
| 4,598,535 | 7/1986 | Sousek . |
| 4,771,592 | 9/1988 | Krone et al. . |
| 4,805,388 | 2/1989 | Kell . |
| 5,060,464 | 10/1991 | Caron . |
| 5,528,887 | 6/1996 | Nagy et al. . |

OTHER PUBLICATIONS

*Farm Show*, vol. 20, No. 5, 1996—"Build–It–Yourself" Narrow Row Header Kit.
1000 Series Corn Head, Operators Manual, 1995 Case Corporation.
1000 Series Corn Head, Parts Catalog, 1993 Case Corporation.
*Farm Industry News,* vol. 29, No. 11, 1996—"Does Narrow Row Corn Add Up?".

(List continued on next page.)

*Primary Examiner*—Terry Lee Melius
*Attorney, Agent, or Firm*—Foley & Lardner

[57] ABSTRACT

An improved row crop header, suitable for mounting on a harvesting machine, for harvesting crops planted in rows. The improved row crop header has a plurality of row units mounted on a frame of the row crop header such that each row unit has two gatherers placed in corresponding offsetting planes. The adjacent gatherers of two adjacent row units are in offsetting planes to permit the overlap of the adjacent gatherers. This overlap of the adjacent gatherers permits the row units to be arranged closer together allowing the instant row crop header to harvest narrower crop rows than the existing corn heads. Also provided is an improved method for harvesting narrow crop rows by providing a row crop header configured so that the adjacent row units of the row crop header are arranged closer together than in the existing corn heads.

22 Claims, 4 Drawing Sheets

OTHER PUBLICATIONS

*Ontario Farmer*, vol. 29, No. 40, 1996—"Thinking 15–Inch".

Allis–Chalmers Tractor Division–Milwaukee, U.S.A., "1918–1960, An Informal History", Copyright 1989 by Alan C. King.

Operators Manual, Setting Up Instructions, "McCormick 34HM–21 Corn Snapper (Two Row, Mounted Type)", International Harvester Company (Date unknown).

Instruction Manual and Parts List, "Snapping Unit Frame Field Improvement Parts for McCormick–Deering, No. 14P, No. 24, Corn Pickers", International Harvester Company (Date unknown).

CP–8 McCormick Parts Catalog, "34HM–20 Corn Picker, 34HM–21 Corn Snapper, 34HM–22 Sweet Corn Picker (Two–Row, Mounted–Type)", International Harvester Company (Date unknown).

NARROW ROW CORN HEAD WITH STAGGERED HEIGHT GATHERING CHAINS

FIELD OF THE INVENTION

This invention relates to a row crop harvesting machine. More particularly, this invention relates to a header for a row crop harvesting machine that is designed to harvest crops, such as corn, planted in narrower rows than in the past.

BACKGROUND OF THE INVENTION

Several variations of header units have been used in combines or harvesting machines for harvesting row crops such as corn and cotton. One of the first such header units was a corn head with fixed spacing between the row units. Several other corn heads allowing variable spacing between the row units were then developed.

With the advent of the variable row width header units, the last several years has seen a rapid increase in the research and development of the effect of varying row widths on the growth of corn and other row crops. The existing corn heads and harvesting machines are designed to efficiently harvest corn planted in rows having a row width of greater than 20 inches, because the existing corn heads have the gatherers of their row units in the same plane, thereby limiting how close the row units can be arranged together.

For example, a typical existing corn head with a plurality of row units has both the gatherers of each row unit positioned in the same plane. Thus, the adjacent gatherers of two adjacent row units are also positioned in the same plane. This limits how close the adjacent row units can be positioned as the adjacent gatherers of the adjacent row units interfere with each other if the adjacent row units are positioned too close to each other. As the technology to build the chains and gears required for efficient operation limits the minimum width of a row unit, the positioning of adjacent row units determines the minimum crop row width that can be efficiently harvested by the existing corn heads. Thus, current technology limits the row widths to about 20 inches because the gatherers in adjacent row units of the existing corn heads interfere with each other if they are brought any closer.

Recent research on the spacing of the corn rows has indicated special benefits for narrower row spacings that are 12–15 inches apart. In addition to the obvious increase in yield and crop population, these benefits include improved erosion control and better weed control. The narrower rows also require less chemicals and pesticides per unit of yield thereby benefitting the environment.

Existing header units are not designed to harvest rows having a spacing of 15 inches or less. Consequently, they are very wasteful and inefficient in harvesting narrow rows leading to a sub-optimal harvesting efficiency.

The problems identified above are not intended to be exhaustive but are among the many that reduce the effectiveness of current solutions to the problem of harvesting crops planted in narrow rows. Other problems may also exist; however, those presented above should be sufficient to demonstrate that currently known solutions are amenable to worthwhile improvement.

SUMMARY OF THE INVENTION

Accordingly, it would be desirable to provide a row crop header that alleviates the problem of harvest efficiency of narrow crop row widths by allowing efficient harvesting of narrower crop rows.

It would also be desirable to provide a row crop header having row units spaced closer together to harvest narrower rows and thereby reduce the use of fertilizers and pesticides and benefit the environment.

It would also be further desirable to provide a method of harvesting row crops using an improved row crop header that allows the harvesting of crops planted in narrower rows than currently practicable.

The present invention provides a row crop header having a plurality of row units mounted on a frame of the row crop header. The plurality of row units includes at least a first row unit and a second row unit adjacent to the first row unit, such that a first gatherer of the first row unit is positioned in a first plane and a second gatherer of the second row unit is positioned in a second plane. The first plane and the second plane are offset and the first gatherer overlaps the second gatherer along an axis that is substantially parallel to both the first plane and the second plane. This configuration allows the two adjacent row units to be positioned closer together because of the overlap. This overlap determines how close the adjacent units can be positioned together. Therefore, the distance between adjacent row units can be reduced by increasing the overlap between the adjacent gatherers.

The present invention also provides a method that provides a row crop header including both a first gatherer of a first row unit and a first gatherer of a second row unit positioned in a first plane, and both a second gatherer of the first row unit and a second gatherer of a second row unit positioned in a second plane. The first and second planes are offset and the first row unit is adjacent the second row unit. The first row unit and second row unit are connected to the frame of the row crop header with the first gatherer of the first row unit adjacent to and overlapping the second gatherer of the second row unit along an axis that is substantially parallel to both the first plane and the second plane. This overlap permits the row crop header to efficiently harvest narrower crop rows when the row crop header is mounted on a harvesting machine.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENT

Figure 1:
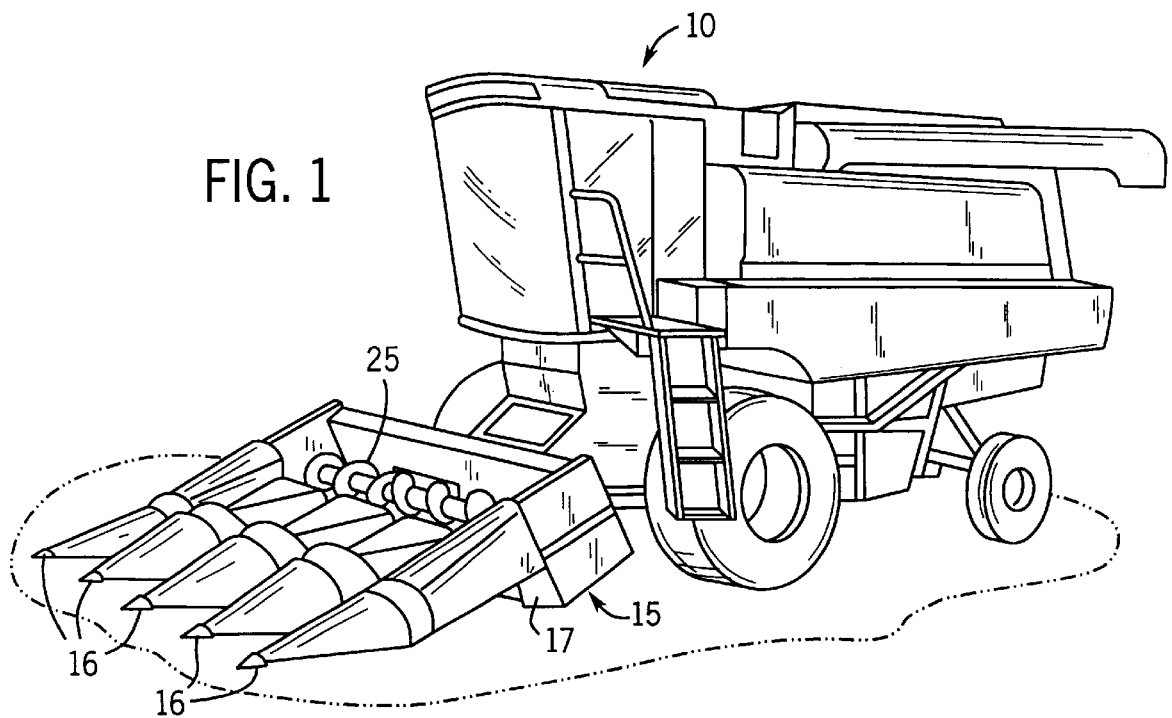
FIG. 1 is a perspective view of a harvesting combine with an attached row crop header provided by the invention.

In the figures, like numerals indicate like parts. FIG. 1 shows an improved row crop header, indicated generally as 15, connected to a combine or harvesting machine 10. The improved row crop header 15 has a unique configuration that permits the efficient harvesting of crops planted in rows spaced closer together than in the past.

Figure 2:
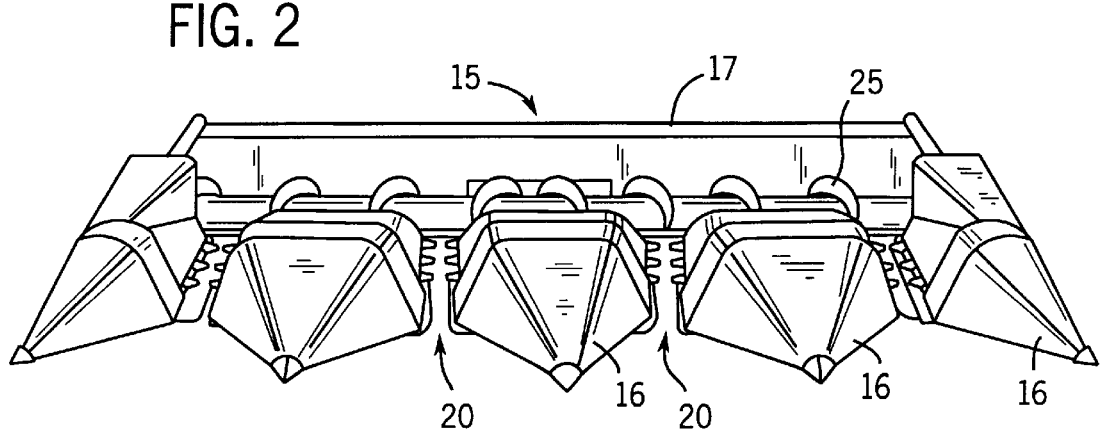
FIG. 2 is a perspective front view of the row crop header shown in FIG. 1.

FIG. 2 shows the row crop header 15 having a plurality of row units 20 connected to a frame 17 of the row crop header 15. The row units 20 are covered by a plurality of housings 16.

Figure 3:
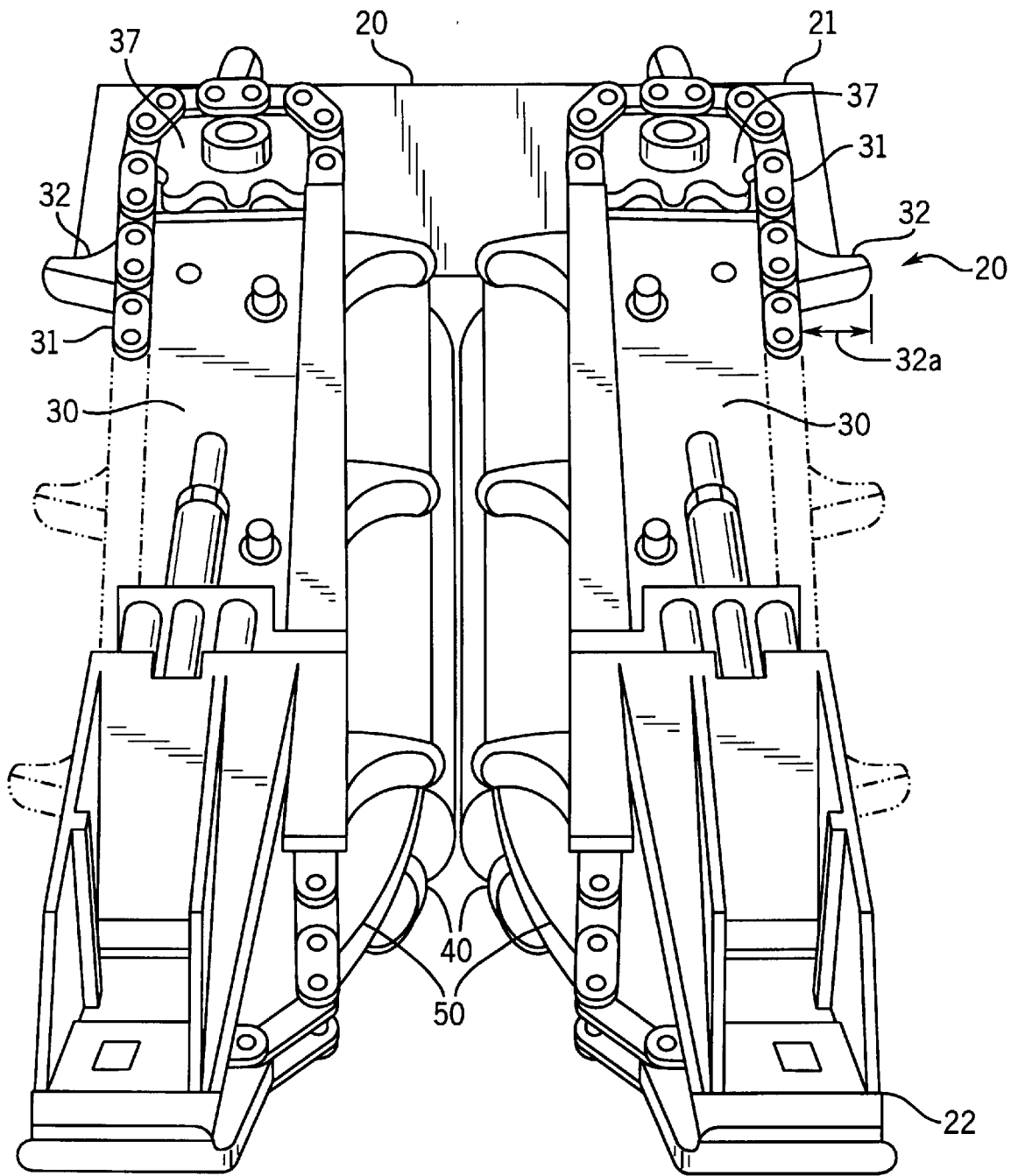
FIG. 3 is a perspective view of a row unit of the row crop header shown in FIGS. 1 and 2.

As shown in FIG. 3, each row unit 20 has a frame end 21 and a head end 22. The frame end 21 of the row unit 20 attaches to the frame 17, while the head end 22 serves as the longitudinal extension of the row unit 20 and as a crop engagement device. That is, the row unit 20 extends forward from the frame end 21 to the head end 22.

Each row unit 20 also has at least one gatherer 30. The preferred embodiment of the row crop header 15, has two gatherers 30. Each gatherer 30 includes a gathering chain 31 with at least one sprocket 37 and has a plurality of fingers 32 extending outward from the gathering chain 31. The fingers 32 are protuberances having at least one surface adapted to contact and move corn ears or other harvested crop. The gathering chain 31 traverses a substantially oval path and extends forward from proximate the frame end 21 to proximate the head end 22 of the row unit 20.

Note that other embodiments of the gatherer 30 are possible, including but not limited to, belts, ropes or other conveying mechanisms. These other conveying mechanisms can include, for example, an auger, a conveyor or any other mechanism that is suitable for moving corn ears or other crops.

A pair of snapping rolls 40 pull the corn stalks so that the corn ears are removed from the stalks when they come into contact with a pair of stripper plates 50. The ears are then carried backwards by the fingers 32 of gathering chain 31 to a conveying mechanism, such as a cross auger 25, which is seen in FIGS. 1 & 2. The auger 25 moves the ears to a grain housing or collection device (not shown) of the harvesting machine 10 on which the row crop header 15 is mounted.

In the preferred embodiment, as shown in FIG. 3, each row unit 20 has two gathering chains 31 that are spaced apart by a distance 33 that is at least twice the width 32a of the fingers 32 of the gathering chains 31. Likewise, the minimum width of the gathering chain 31 is limited by the current technology to permit efficient operation of the row units. The spacing distance 33 and the width of the gathering chains 31 limit the minimum width of the row units 20.

Figure 4:
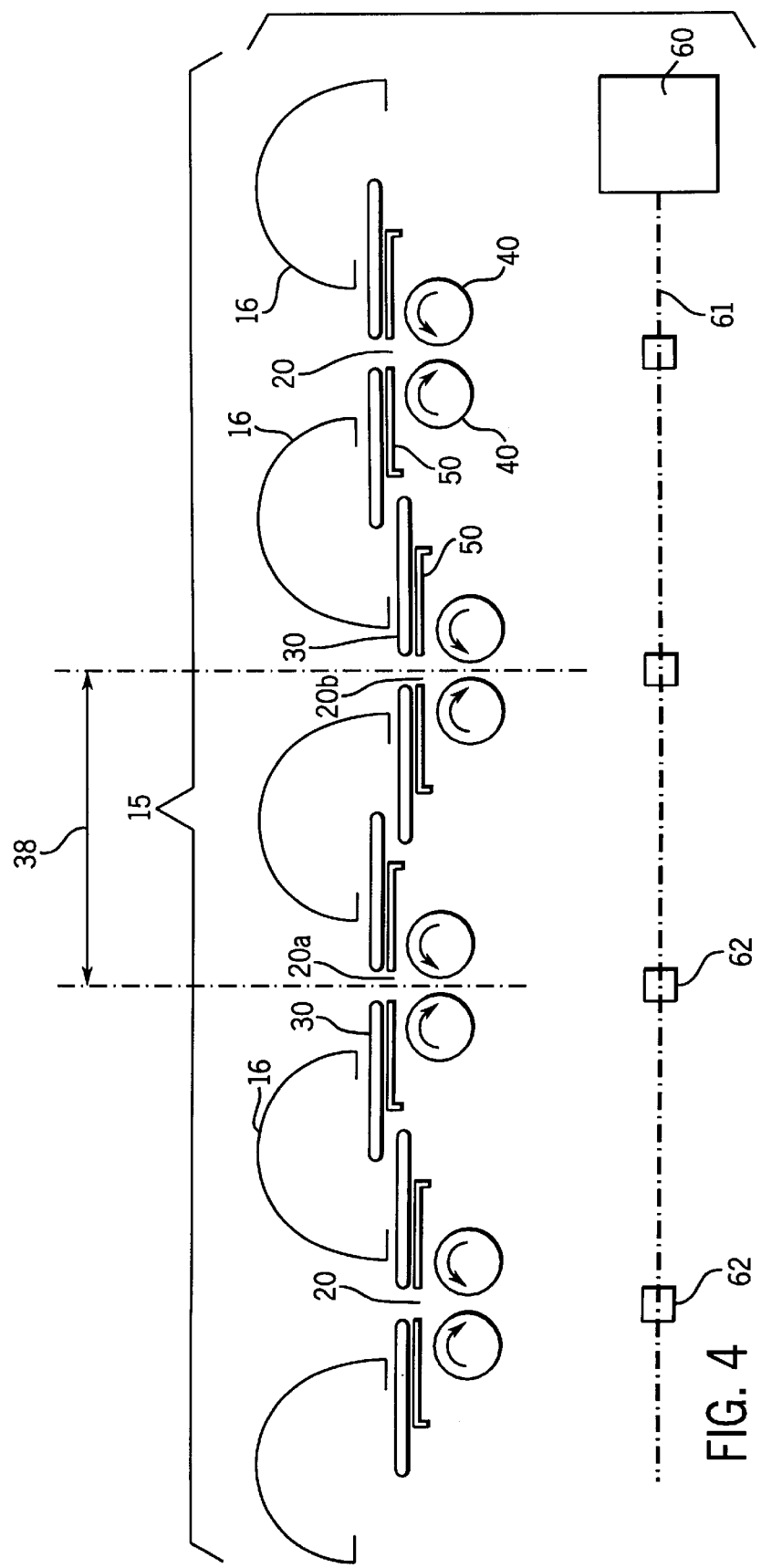
FIG. 4 is a schematic front view of the row crop header showing a plurality of adjacent row units, each of the row units having their two gatherers in corresponding offsetting planes.
Figure 5:
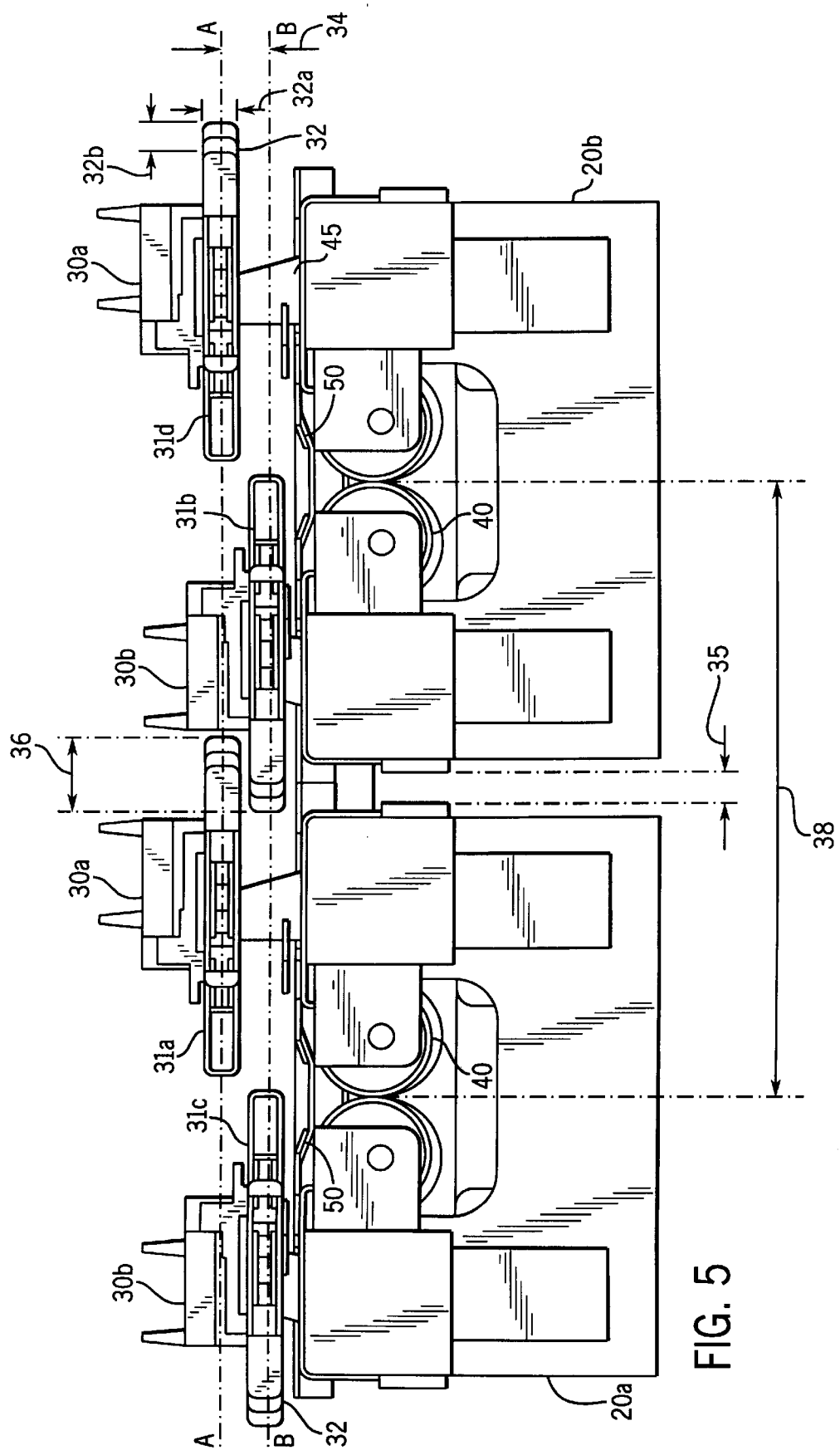
FIG. 5 is a detailed front view of one pair of the adjacent row units of the row crop header shown in FIGS. 1, 2, and 4.

FIGS. 4 & 5 show the unique configuration of the row units 20 and the gatherers 30 of row crop header 15. FIG. 4 is a schematic front view of a plurality of row units 20 of the preferred embodiment of the row crop header 15. Each of the plurality of row units 20 is connected to the frame of the row crop header 15 with a housing 16 covering the adjacent gatherers 30 of two adjacent row units 20. The housing 16 also serves as guides for the corn stalks as the row crop header is moved forward by the harvesting machine 10, shown in FIG. 1.

It is to be understood that "adjacent" row units refer to two row units 20, such as row unit 20a and row unit 20b, that are placed next to each other along the frame although structural members or other elements could be interposed between the two adjacent row units 20. Thus, row unit 20a is adjacent to row unit 20b as long as no other row unit 20 is positioned between them even though other structural members or elements may be interposed between them.

As shown in FIG. 5, each row unit 20 includes a first gatherer 30a positioned in a first plane AA and a second gatherer 30b positioned in a second plane BB. The first plane AA and the second plane BB are offset 34. The offset 34 is a measure of the separation of the two planes AA, BB.

In the preferred embodiment of the row crop header, the offset 34 always has a positive value as the two planes AA and BB are distinct and do not coincide. Also, in the preferred embodiment, the two planes AA and BB are substantially parallel to each other and the offset 34 is measured along an axis that is perpendicular to both the first plane AA and the second plane BB.

The offset 34 between the two planes AA, BB can be made adjustable to optimize the effectiveness of the gathering chains 31 in moving the harvested crop backward to the cross auger 25 and thereon to the grain collection device. Such an adjustment mechanism could be provided by having a supporting bracket (not shown) for each gathering chain 31 with a plurality of slots so that the gathering chains 31 could be positioned in any of the slots to increase or decrease the offset 34 between the adjacent gathering chains 30.

As shown in FIG. 5, two adjacent row units, a first row unit 20a and a second row unit 20b are arranged closer together than is possible in the existing corn heads as the adjacent chains 31a, 31b of two adjacent row units 20a, 20b are in the first plane AA and the second plane BB, respectively. The first plane AA and the second plane BB are substantially parallel to each other and spaced by the offset 34. This offset 34 permits the adjacent gathering chains 31a, 31b to overlap 36 along an imaginary axis that is substantially parallel to both the first plane AA and the second plane BB.

The fingers 32 of the adjacent chains 31a, 31b of adjacent row units 20a, 20b overlap as the chain 31a of row unit 20a is offset 34 from the adjacent chain 31b of row unit 20b. The overlap 36 permits the distance 35 between two adjacent row units 20a, 20b to be reduced by the amount of the overlap 36. Thus, the overlap 36 allows a closer arrangement of the row units 20 so that the crop row width 38 is less than minimum crop row width achievable in the existing corn heads.

In the preferred embodiment of the row crop header 15, the overlap 36 is approximately 5 inches to permit the reduction of the crop row width 38 to 15 inches. In the preferred embodiment, the offset 34 is approximately 1.5 inches which allows the two adjacent gathering chains 31a, 31b to overlap 36 sufficiently to reduce the crop row width 38 of the row crop header 15. The offset 34 should also preferably be greater than the finger height 32b to ensure that the fingers of adjacent gathering chains, such as 31a and 31b, do not interfere with each other during the operation of the row crop header 15.

The gatherers 30 and the snapping rolls 40 are driven by a power source 60, shown schematically in FIG. 4. In the preferred embodiment, the power source 60 includes a drive shaft 61 with a plurality of gear boxes 62 adapted so that the power outputs from the gear boxes 62 drive the first gatherer 30a, the second gatherer 30b and the snapping rolls 40. Other embodiments of the power source 60 are also possible, for example, different power sources could be used to drive the snapping rolls 40 and the gatherers 30. Alternatively, a single power source could be used with a plurality of drive shafts and drive means. Such gear boxes 62 and drive means are described in several U.S. Patents and any of them could be easily adapted for use with the row crop header of the present invention. For example, these include the drive means shown in U.S. Pat. No. 3,462,928 issued to L. D. Schreiner and in U.S. Pat. No. 3,599,409 issued to Martin J.

Whitney, the disclosures of which are incorporated, in their entirety, by reference.

The stripper plates 50 can be spatially adjusted to optimize the effectiveness of the stripper plates 50 in cooperating with the snapping rolls 40 to remove corn ears from the stalks and increase harvesting efficiency.

With reference to FIGS. 4 & 5, an improved method is also provided which includes providing a row crop header 15 with two adjacent row units 20a, 20b such that both a first gatherer 30a of a first row unit 20a and a first gatherer 30a of a second row unit 20b, are in a first plane AA, and both a second gatherer 30b of the first row unit 20a and a second gatherer 30b of the second row unit 20b, are in a second plane BB, with first plane AA and the second plane BB being substantially parallel to each other and spaced by an offset 34.

The method also provides for attaching the first row unit 20a and the second row unit 20b to a frame of the row crop header 15 so that the first gatherer 30a of the first row unit 20a overlaps the adjacent second gatherer 30b of the second row unit 20b along an axis that is substantially parallel to both the first plane AA and the second plane BB. This overlap 36 permits the row units 20a, 20b to be arranged closer together to further reduce the crop row width 38 than in the existing corn heads and this enables the instant row crop header 15 to efficiently harvest crops planted in narrow rows.

This method also provides for attaching the row crop header 15 to a harvesting machine 10, such as the one shown in FIG. 1, and operating the row crop header 15 using a power source 60 to harvest the crop rows planted in narrower rows than in the past. Note that the preferred embodiment of the invention is discussed as operating on rows of corn. However, the instant row crop header could be easily adapted to work with other row crops, such as cotton and sunflower.

Thus, the instant row crop header 15 permits a closer arrangement of the row units 20 to harvest crop rows that are 15 inches apart or less. Existing corn heads with the gatherers in substantially the same plane are unable to efficiently harvest rows that are narrower than 20 inches. Therefore, some of the major advantages of the instant row crop header include the unique combination of providing an improved apparatus and method that:

(i) permits the harvesting of narrower crop rows by allowing the row units to be arranged closer together on the row crop header frame;

(ii) benefits the environment by reducing the requirement for chemicals and pesticides per unit of crop harvested; and (iii) improves soil control and erosion by allowing crop rows to be planted closer together.

Other embodiments of the row crop header will be apparent to those skilled in the art from consideration of the specification disclosed herein. It is intended that the specification be considered as exemplary only, with the true scope and spirit of the invention being indicated by the following claims.

What is claimed is:

1. A row crop header for an agricultural harvesting machine comprising:

a frame; and a plurality of substantially parallel row units mounted to said frame having a frame end and a head end, the plurality of row units including a first row unit and a second row unit adjacent the first row unit, the first row unit including first and second substantially parallel gatherers extending in first and second offset planes, respectively, the second row unit including third and fourth gatherers extending substantially parallel to the first and second gatherers, the third gatherer extending in a third plane and the fourth gatherer extending in a fourth plane offset from the third plane, wherein the first and fourth gatherers overlap between the first and second row units at the head end, whereby the first and second row units accommodate narrowly spaced crop rows.

2. A row crop header according to claim 1 wherein each of said first gatherer and said second gatherer includes a plurality of fingers having a finger height and a finger width, and wherein said offset is greater than said finger height.

3. A row crop header according to claim 2 wherein each of said first gatherer and said fourth gatherer includes a chain operatively connected to said plurality of fingers.

4. A row crop header according to claim 3 wherein said chain traverses a substantially oval path.

5. A row crop header according to claim 1 wherein said offset is approximately 1.5 inches.

6. A row crop header according to claim 1 wherein said first plane is substantially parallel to said second plane.

7. A row crop header according to claim 1 wherein said offset is adjustable.

8. A row crop header according to claim 1 wherein said overlap is less than said finger width.

9. A row crop header according to claim 1 wherein said overlap is approximately 5.0 inches.

10. A row crop header according to claim 1 wherein each of said plurality of row units further comprises:

a plurality of snapping rolls supported by said frame; and a plurality of stripper plates cooperatively positioned within said first row unit proximate said plurality of snapping rolls to remove ears from corn stalks, wherein said first gatherer and said second gatherer move said removed ears towards a collection device.

11. A row crop header according to claim 10 further comprising:

a power source including a gear box wherein a power output from said gear box drives said plurality of snapping rolls.

12. A row crop header according to claim 10 further comprising:

a power source including a gear box wherein a power output from said gear box drives said first gatherer and said second gatherer.

13. A row crop header according to claim 10 further comprising:

a power source including a gear box wherein a power output from said gear box drives said first gatherer, said second gatherer and said plurality of snapping rolls.

14. A row crop header according to claim 10 wherein said plurality of stripper plates comprises two adjustably spaced stripper plates.

15. The row crop header of claim 1, wherein the fourth gatherer and the first gatherer overlap one another at the head end.

16. The row crop header of claim 1, wherein the third plane and the fourth plane are offset from one another.

17. The row crop header of claim 1, wherein the third plane is coextensive with the first plane.

18. The row crop header of claim 1, wherein the fourth plane is coextensive with the second plane.

19. A row crop header for an agricultural harvesting machine, the row crop header comprising:

a frame;

a plurality of row units mounted to the frame having a frame end and a head end, the plurality of row units including:

a first row unit;

a second row unit extending substantially parallel to the first row unit, adjacent the first row unit in a first plane;

a first gatherer extending adjacent to and along the first row unit;

a second gatherer extending adjacent to and along the first row unit opposite the first gatherer in a second plane offset from the first plane;

a third gatherer extending adjacent to and along the second row unit in a third plane; and a fourth gatherer extending adjacent to and along the second row unit between the first row unit and second row unit and opposite to the third gatherer, wherein a fourth gatherer overlaps the first gatherer at the head end.

20. The row crop header of claim 19, wherein the third plane and the fourth plane are offset from one another.

21. The row crop header of claim 19, wherein the third plane is coextensive with the first plane.

22. The row crop header of claim 19, wherein the fourth plane is coextensive with the second plane.

* * * * *